March 29, 1949.　　　J. G. GARDNER　　　2,465,641
DRAW BAR FOR TRACTORS
Filed Dec. 5, 1945

INVENTOR.
Joseph G. Gardner,
BY Victor J. Evans & Co.
ATTORNEYS

Patented Mar. 29, 1949

2,465,641

UNITED STATES PATENT OFFICE 2,465,641

DRAWBAR FOR TRACTORS

Joseph G. Gardner, Leadville, Colo.

Application December 5, 1945, Serial No. 632,841

1 Claim. (Cl. 280—33.44)

This invention relates to a draw bar for use with a Ford tractor.

An object of the invention is to provide a device that will add more weight to the rear of the tractor thereby increasing the traction of the tractor and preventing the front wheels from losing contact with the ground when a load is being drawn.

Another object of the invention is to provide a device that is especially adapted for use with plows, harrows, discs, wagons or other harvesting implements.

With these and other objects and advantages in view the invention consists of the novel details of construction, combination and arrangement of parts which will be hereinafter more fully described, illustrated in the accompanying drawing and then specifically defined in the appended claim.

In the accompanying drawing forming a part of this specification;

Figure 1:
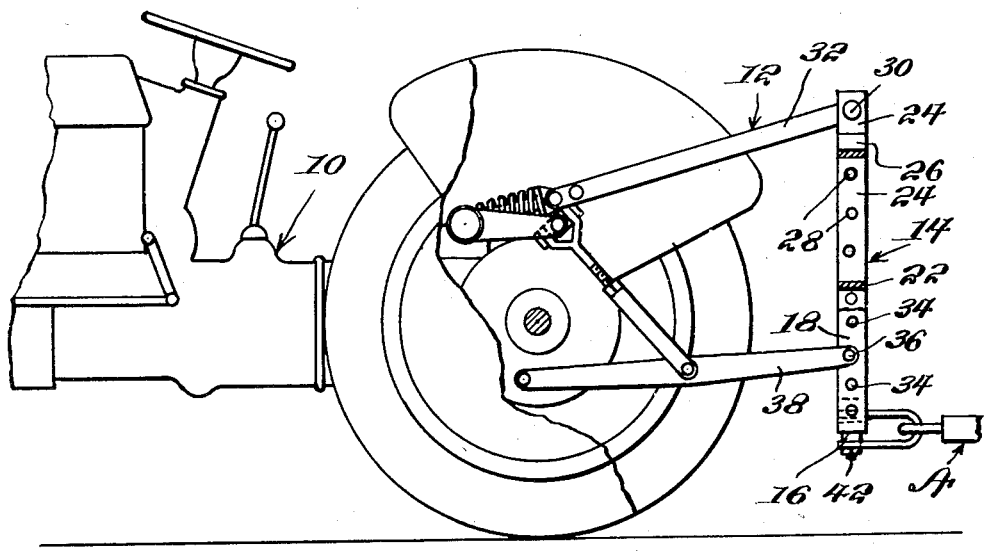
Figure 1 is a side view of an embodiment of the invention as applied to a tractor.
Figure 2:
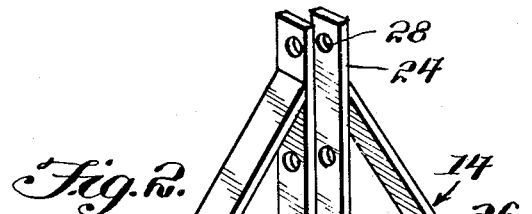
Figure 2 is a perspective view thereof.

Referring more in detail to the drawing the numeral 10 indicates a Ford tractor to which is attached the Ferguson linkage 12. These elements are conventional and only form the linkage to which the draw bar generally designated as 14 is connected.

The drawbar 14 comprises a substantially rectangular frame having a horizontal base 16, bent upwardly at the ends thereof are vertical sides 18, which are joined at 20 by the intermediate bar 22 parallel to the base 16 at the point where the bar 22 joins the sides they are bent or inclined inwardly as at 26. At their upper ends the inwardly bent portions are joined to the vertical bars 24, which are joined at their lower ends to the bar 22.

The bars 24 are provided with openings 28 to receive a pivot pin 30 which is adapted to connect the bars 24 of the draw bar 14 to the intermediate or top bar 32 of the Ferguson linkage 12, the openings are spaced so that the leverage can be decreased or increased according to the load or machine which is being drawn by the tractor.

The sides 18 are provided with a plurality of openings 34 to receive pivot pins 36 which are adapted to connect the sides 18 of the draw bar 14 to the outer or lower bars 38 of the Ferguson linkage 12.

The base 16 being provided with a plurality of openings 40 permits the load A to be hitched to the base 16 at any desired point by means of a pivot pin 42.

By using this draw bar with a Ford tractor when a load is being drawn more weight will be added to the front of the tractor and more to the rear of the tractor to increase traction on the rear wheels and prevent the front of the tractor from rearing and losing contact with the ground.

The draw bar is capable of adjustment at three points, on the sides, the vertical bars and the base. It is an integral unit being welded at the points not joined by bending. The adjustments as stated will increase in proportion to the pull of the tractor, this leverage of the drawbar can be removed or decreased as desired.

These adjustments provide a marked advantage over all previous bars since they save gas, permit better pull of the tractor and perform a more all around efficient job.

It is believed that the operation of the device will be apparent to those skilled in the art and that a device has been provided that accomplishes the objects of the invention.

It is believed that various changes in the construction and arrangement of the several parts herein shown and described may be employed without departing from the spirit of the invention as described in the appended claim.

Having thus described the invention what is claimed as new and desired to be secured by Letter Patent is:

A device of the character described in combination with a tractor having a linkage connected thereon, a rectangular frame member secured thereto said frame member comprising a horizontal base, vertical sides formed integral with said base, a horizontal bar connected to said vertical sides inwardly thereof at the upper ends thereof in parallel relation to said base, vertical parallel spaced bars connected at their lower ends to said horizontal bar, said sides being inclined at their upper ends from the joining point of said horizontal bar and said vertical sides, to join said vertical bars adjacent their upper ends, openings in said bars and said vertical sides for adjustably connecting said frame to said linkage on said tractor, and openings in said base to adjustably connect a load thereto and means for connecting a load to be drawn to said frame member.

JOSEPH G. GARDNER.

REFERENCES CITED

The following references are of record in the file of this patent:

UNITED STATES PATENTS

| Number | Name | Date |
|---|---|---|
| 2,321,516 | Robertson | June 8, 1943 |
| 2,341,807 | Olmstead et al. | Feb. 15, 1944 |